(12) United States Patent
Loveland

(10) Patent No.: US 6,437,819 B1
(45) Date of Patent: Aug. 20, 2002

(54) AUTOMATED VIDEO PERSON TRACKING SYSTEM

(76) Inventor: Rohan Christopher Loveland, 801 Locust Pl., NE. Apt. #2032, Albuquerque, NM (US) 87102

( * ) Notice: Subject to any disclaimer, the term of this patent is extended or adjusted under 35 U.S.C. 154(b) by 0 days.

(21) Appl. No.: 09/344,988

(22) Filed: Jun. 25, 1999

(51) Int. Cl.$^7$ .................................................. H01N 7/18
(52) U.S. Cl. ........................ 348/143; 348/169; 348/212
(58) Field of Search ................................ 348/143, 159, 348/169, 211, 212, 214, 170; H04N 7/18

(56) References Cited

U.S. PATENT DOCUMENTS 5,521,634 A * 5/1996 McGary ...................... 348/143
5,610,653 A * 3/1997 Abecassis ................... 348/170
6,055,014 A * 4/2000 Hosonuma et al. ........ 3148/143

* cited by examiner

Primary Examiner—Howard Britton

(57) ABSTRACT

An automated system for controlling multiple pan/tilt/zoom video cameras in such a way as to allow a person to be initially designated and tracked thereafter as he/she moves through the various camera fields of view. Tracking is initiated either by manual selection of the designated person on the system monitor (82) through the usage of a pointing device (83), or by automated selection of the designated person using software. The computation of the motion control signal is performed on a computer (81) through software using information derived from the cameras connected to the system, and is configured in such a way as to allow the system to pass tracking control from one camera to the next, as the designated person moves from one region to another. The system self-configuration is accomplished by the user's performance of a specific procedure involving the movement and tracking of a marker throughout the facility.

13 Claims, 5 Drawing Sheets

FIG. 1 Typical Multi-Camera Security System
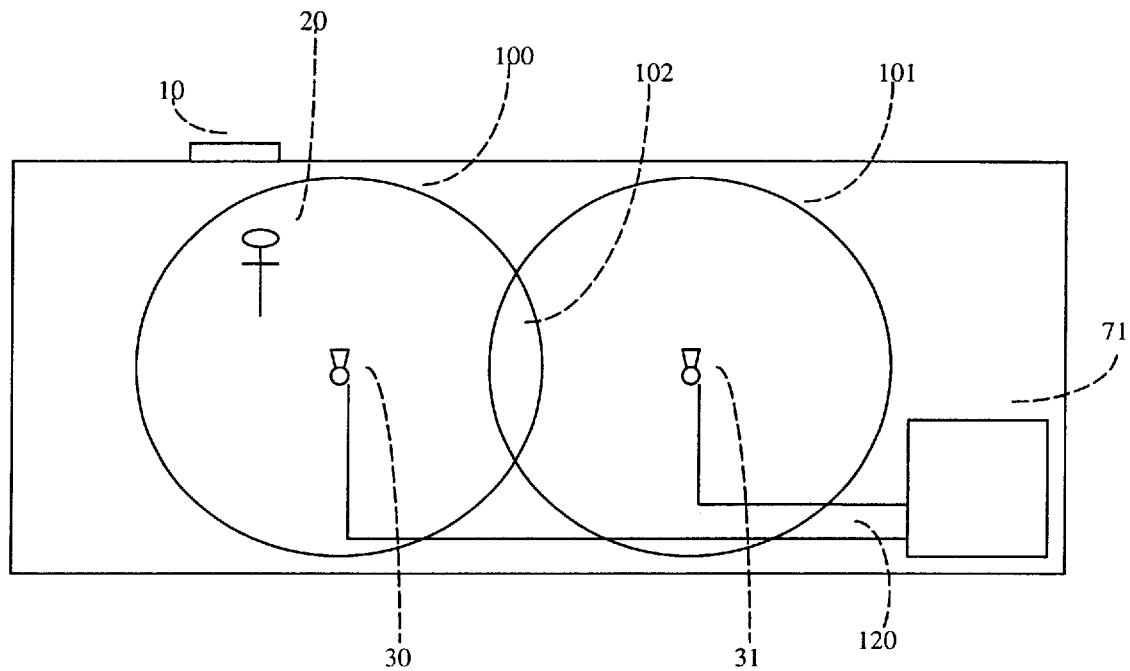
FIG. 2 Typical Guard Monitoring System
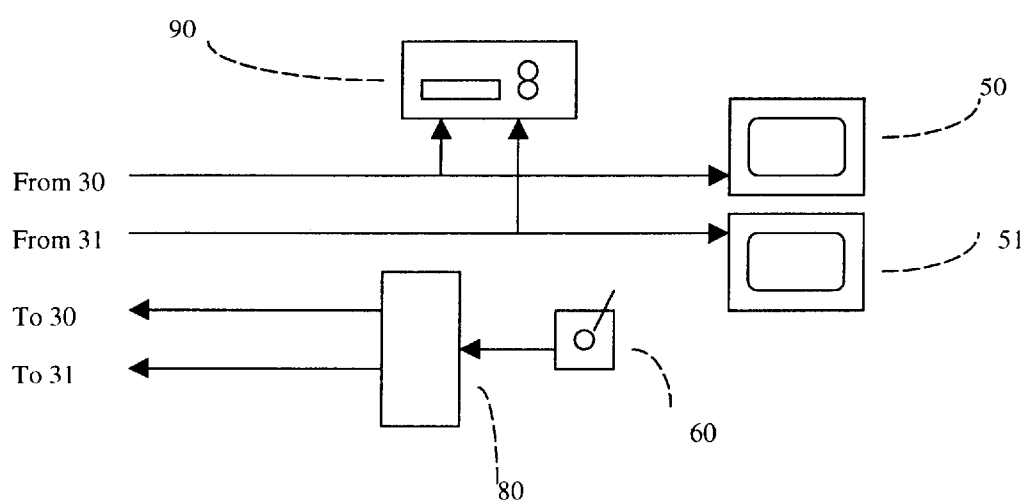

FIG. 3 Automated Video Person Tracking System
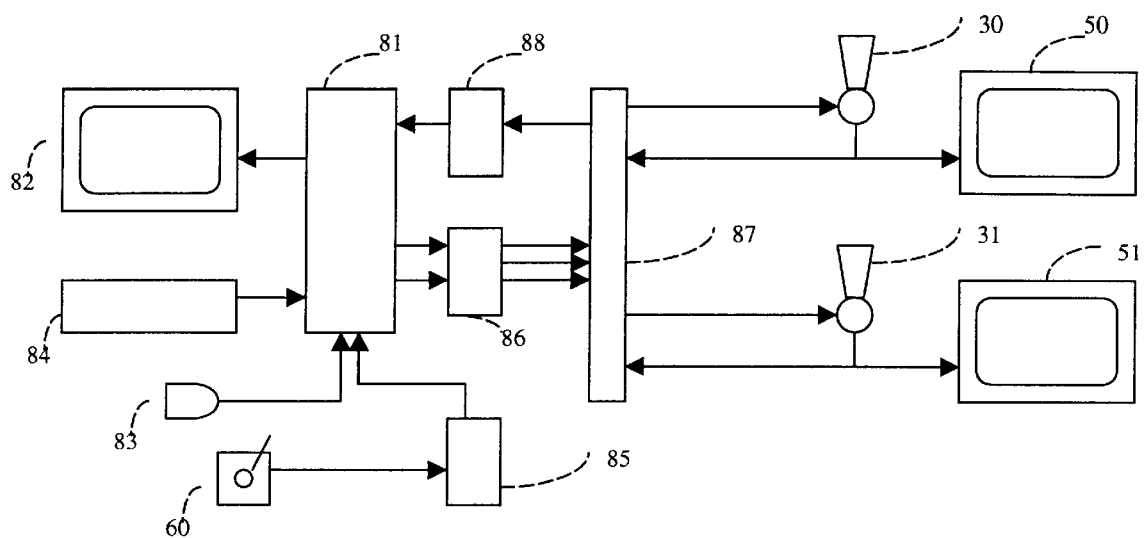
FIG. 4 Store as Person Enters
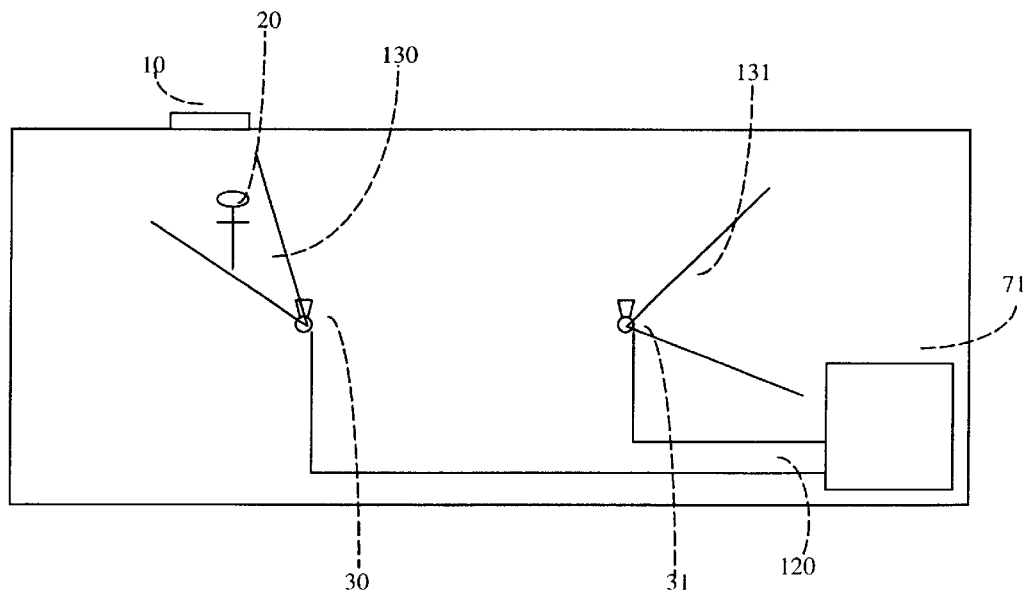

FIG. 5 Camera Hand-Off
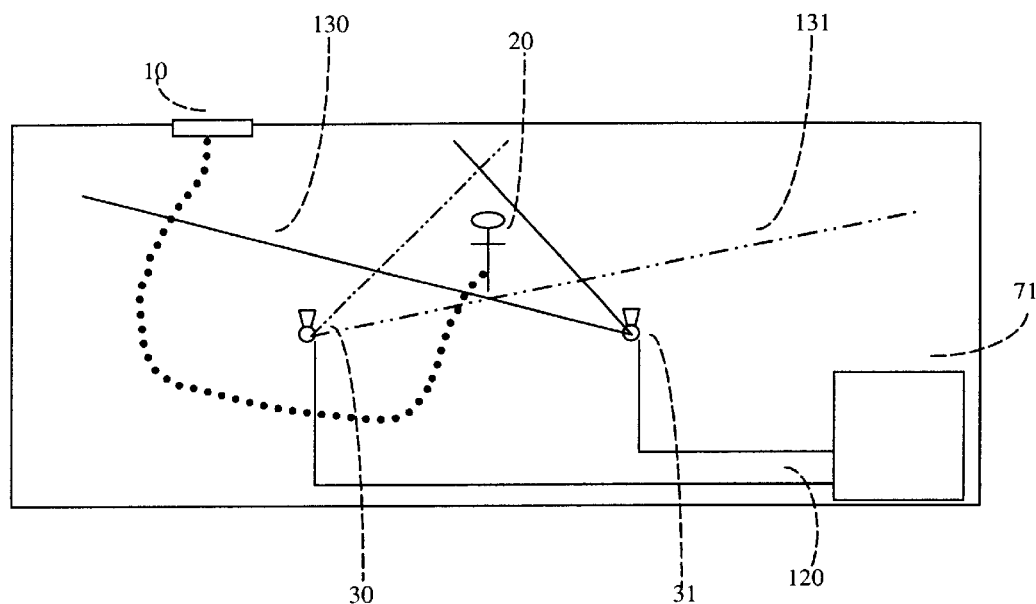
FIG. 6 System Self-Configuration
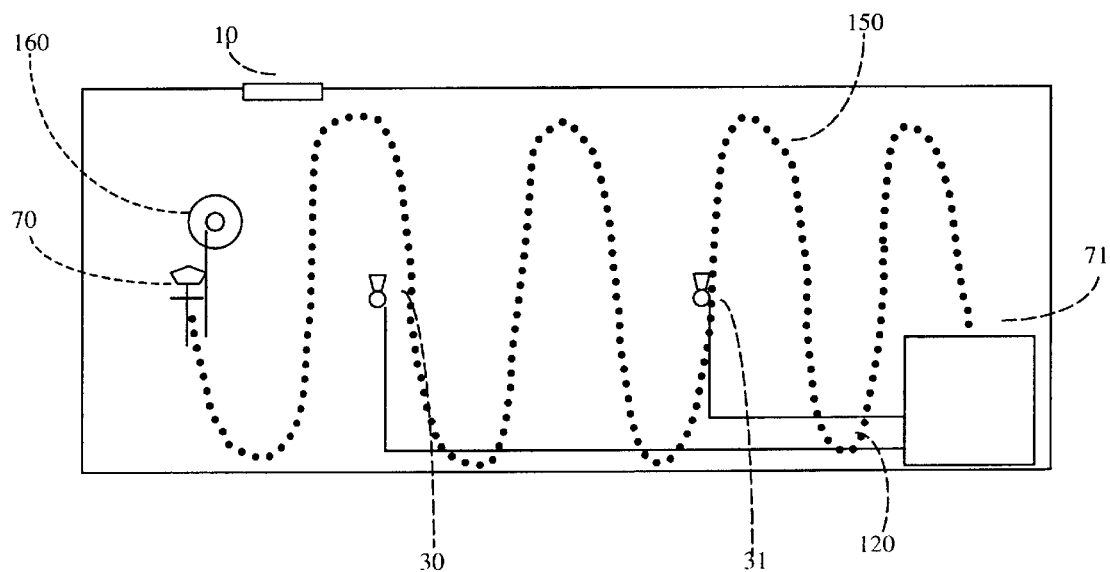

FIG. 7 Flowchart of Program in Regular Operation
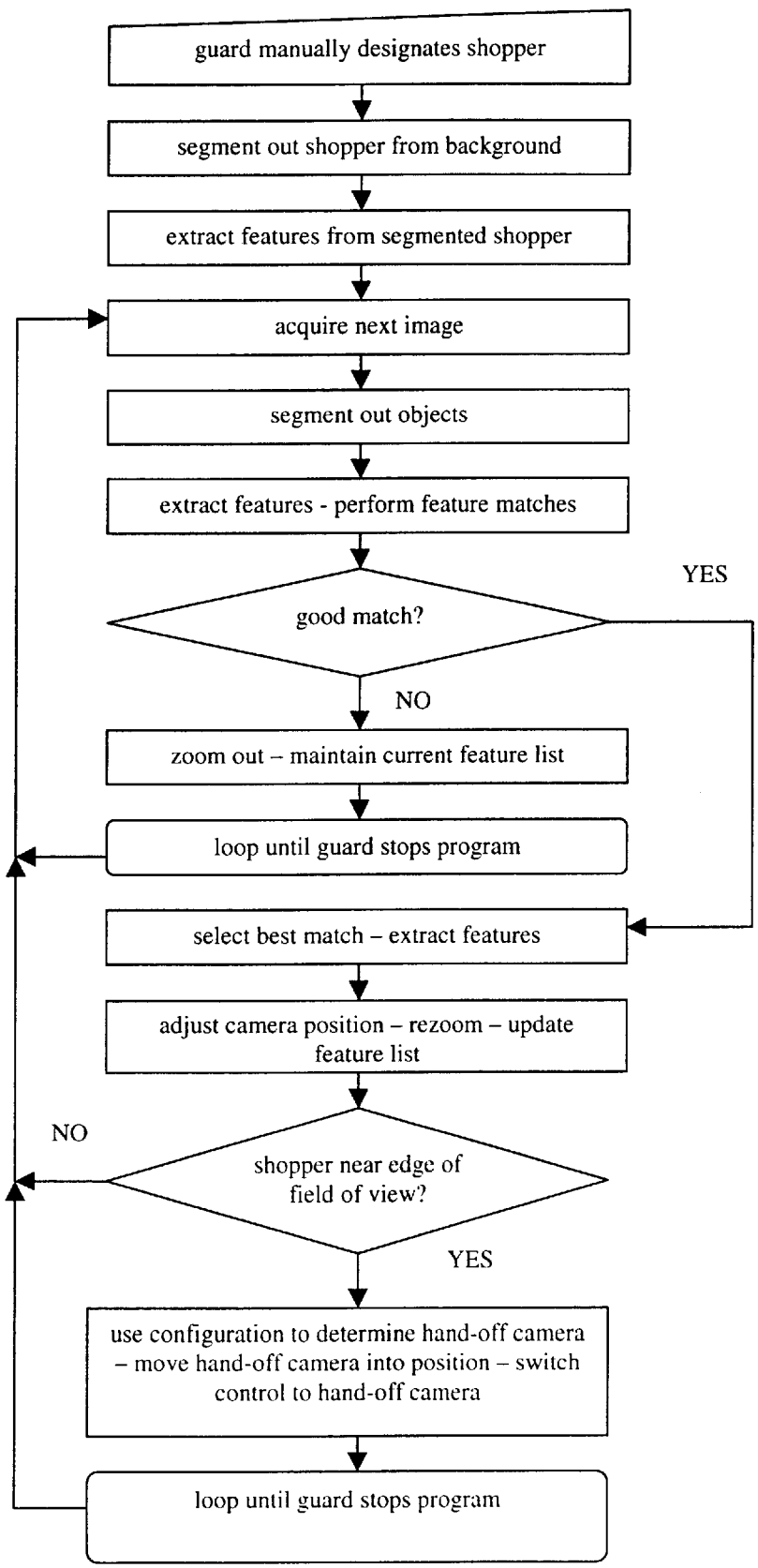

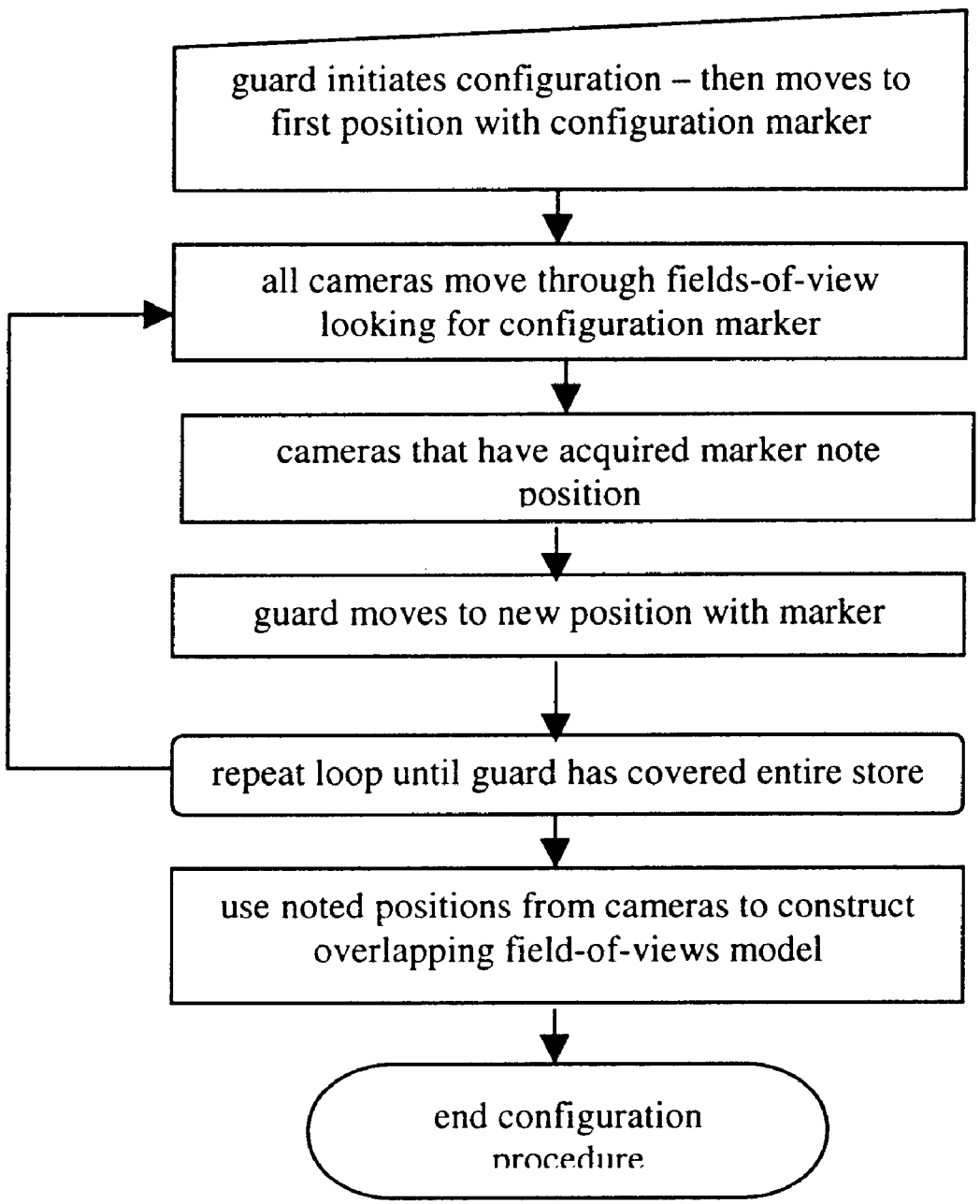
FIG. 8 Flowchart of Program in Configuration Mode

AUTOMATED VIDEO PERSON TRACKING SYSTEM

BACKGROUND OF THE INVENTION

This invention relates to video surveillance systems, specifically to a system that will automatically track a person as he/she moves around.

Many retail stores use video surveillance of customers to prevent shoplifting. Two types of cameras are used for this purpose: fixed cameras, and. pan/tilt/zoom cameras (PTZ's). The fixed cameras are stationary, and are used to constantly monitor the same location. The PTZ cameras can be rotated around, and are used to zoom in on a particular location or person. Stores generally have a mixture of both types of cameras mounted on the ceiling throughout the store, with the resulting footage from these cameras being recorded for potential use as future evidence.

The field of view of a fixed camera is constant, so it is usually set up to cover a broad area, or one of particular interest (e.g. a jewelry counter or cash register). If it is covering a broad area, such as the whole music department, a single person will only comprise a small part of the entire image. This can make it difficult to determine from the image exactly what a person is doing. It might be impossible to distinguish a shoplifting incident, such as a person putting a CD into a pocket, from a normal gesture, such as someone's sticking his hand into his jacket pocket.

The limitations of fixed cameras give rise to the use of PTZ cameras. If the camera is pointed and zoomed in appropriately, a person can be observed in more detail, so that innocent actions can be distinguished from theft. For this reason, it is common practice for security personnel to monitor customers by following them with PTZ's as they move around the store.

In the prior art, the PTZ's are controlled with joysticks or a mouse and computer interface, with the guard being required to manually follow a customer with the camera as they move about. This manual tracking process has the following disadvantages:

1) the guard needs to devote his/her full attention to the tracking process;
2) it is impossible for a single guard to track more than one subject simultaneously;
3) limitations in human manual dexterity make resulting video coverage jerky and incomplete;
4) limited human attention spans can result in a guard's losing interest in a subject, and ceasing to track him, before the subject has left the store;
5) the process of shifting from one PTZ camera to a different one, as the subject moves from one region in the store to another, is a difficult process to do manually and usually results in a gap in coverage; and
6) if the guard is involuntarily distracted, e.g. with a phone call, there will be a gap in coverage.

The area of tracking moving objects with cameras has a long history, with origins in military applications. U.S. Pat. No. 3,953,669 to Saccomani (1976) discloses the selection of a target with a light pen, with a relatively simple procedure for producing an error signal allowing the window to be moved to keep the target centered. U.S. Pat. No. 3,988,534 to Sacks (1976) discloses another system with an automatically generated "tracking gate" target selection, with another procedure for producing an error signal that controls a servo allowing the camera to keep the target centered. Both of these systems are for use with single cameras only, and are limited to extremely high contrast situations where the target is extremely visually distinct from the background, due to the simplicity of the tracking algorithms.

More recently, U.S. Pat. No. 5,434,617 to Bianchi (1995) combines a fixed camera and a PTZ camera to track an individual, with the tracking algorithm based on pixel differencing techniques calculated on the fixed camera view, with a resulting motion control signal used to point the PTZ camera. This system requires that a fixed camera always be used in conjunction with the PTZ, and is once again limited to a single PTZ camera's field of view. The system does have a slightly more robust tracking algorithm than those of Saccomani and Sacks, but will still not hold up against a complex background.

Other recent patents (e.g. U.S. Pat. Nos. 5,552,823 (1996), 5,706,362 (1998), 5,714,999 (1998), and 5,754,225 (1998)) are similar in that they disclose systems implementing algorithms for tracking individuals with cameras, with varying means of designating targets and varying complexity/robustness levels of the algorithms. All of these prior art systems are limited to single camera usage, and do not discuss the issues arising from multiple camera usage with hand-offs and self-configuration, that are addressed by the current invention.

Some computer automated tracking systems for outdoor vehicle tracking (e.g. in large facility yards) are currently offered for sale commercially, such as the e.clips™ system from Cortex, Inc. This system is limited to controlling a single PTZ camera as well, however, and does not perform the "hand-off" or auto-configuration procedures necessary for use with multiple cameras.

There are no systems that are currently offered commercially, and none known in the art, for automatically tracking individuals using multiple cameras as they move throughout stores, as disclosed by this invention.

BRIEF SUMMARY OF THE INVENTION

Thus, the present invention, with computer automated tracking of individuals, has several advantages over the current manual tracking methods. Specifically, it:

1) allows the guard to concentrate on other activities, as necessary, after the initial designation of the subject to be tracked;
2) allows more than one subject to be tracked simultaneously, subject to the positions of the subjects and the number of available cameras;
3) results in smoother and more complete video coverage;
4) tracks a subject continuously, for as long as necessary, until the subject leaves the store;
5) allows seamless shifting from one PTZ camera to a different one, as the subject moves from one region in the store to another;
6) does not matter if the guard becomes involuntarily distracted temporarily, since the system will continue to track automatically.

Further objects and advantages include allowing integration of the tracking function with other computer automation, so that, for instance, a database of known previous shoplifters may be maintained, and enabling selection of potential tracking targets automatically through the use of incorporated face recognition software. Still further objects and advantages will become apparent from a consideration of the following detailed description, the accompanying drawings, and the claims.

BRIEF DESCRIPTION OF THE SEVERAL VIEWS OF THE DRAWING

FIG. 1 shows the basic layout of a typical store with a multi-camera security system.

FIG. 2 shows a basic guard monitoring station.

FIG. 3 shows a block diagram of the invention and its connections to the other system components.

FIG. 4 shows typical camera positions as someone enters the store.

FIG. 5 shows camera positions for a "hand-off" as the shopper moves through the store.

FIG. 6 shows camera positions and guard path for the initial camera configuration procedure to determine fields-of-view.

FIG. 7 shows a flow diagram for a particular embodiment of the software during regular tracking operation.

FIG. 8 shows a flow diagram for a particular embodiment of the software during the initial configuration of the system.

REFERENCE NUMERALS IN DRAWINGS

| | | | |
|---|---|---|---|
| 10 | Store Entrance | 20 | Shopper |
| 30 | PTZ Camera One | 31 | PTZ Camera Two |
| 50 | PTZ Monitor One | 51 | PTZ Monitor Two |
| 60 | PTZ Joystick Controller | 70 | Security Guard |
| 80 | Automated Tracking System | 81 | Tracking Computer |
| 82 | Tracking Computer Monitor | 83 | Tracking Computer Mouse |
| 84 | Tracking Computer Keyboard | 85 | Joystick-input Interface |
| 86 | PTZ Control Interface | 87 | PTZ Control Multiplexer |
| 88 | Camera Digitizer | 90 | Recording Setup |
| 100 | PTZ Camera One Total Field of View | 101 | PTZ Camera Two Total Field of View |
| 102 | Intersection of Regions 100 and 101 | 120 | Cable Connections |
| | | 160 | Configuration Marker |
| 130 | PTZ Camera One Zoomed Field of View | | |
| 131 | PTZ Camera Two Zoomed Field of View | | |
| 150 | Guard Configuration Path | | |

DETAILED DESCRIPTION OF THE INVENTION

The preferred embodiment of the present invention is illustrated by way of example in FIGS. 1–8.

The environment in which a typical embodiment of the invention might be used is shown in FIG. 1 and FIG. 2. The automated tracking system 80 is located in a central monitoring station, being connected by cables 120 to the store PTZ cameras 30, 31, the PTZ joystick controller 60, and the monitors 50 and 51. The total possible fields of view of cameras One and Two 30,31 are shown by the two circles 100,101. It is apparent that the store may be divided into three regions: one region which may be viewed only with PTZ camera One 30, another region which may be viewed only by PTZ camera Two 31 and a region between them 103 viewable by both cameras 30,31. It should be noted that the choice of two cameras 30,31 in this system is arbitrary—the tracking system will also work in a store network with many more cameras than just two.

The central monitoring station is shown in FIG. 2. The tracking system is activated by the guard 70 who uses the mouse 83 to click on a person 20 (the shopper) in the field of view 100 of PTZ camera One 30, whose image is shown on both the tracking system monitor 82 and the standard monitor 50 for PTZ camera One 30. The tracking system 80 then takes over control of the panning and zooming functions of the PTZ camera One 30, automatically moving and focusing it so as to keep the shopper 20 in constant view of the camera.

The components of the invention itself are shown in FIG. 3. The heart of the system is the computer 81, which has the standard additions of a mouse 83, keyboard 84, and monitor 82. The computer 81 also has several interfaces connected to it, either through ports or as cards plugged into the computer's data bus system. Among these are a joystick-input interface 85, a PTZ control interface 86, and a camera digitizer 88. All of these components are well known and may be accomplished by any compatible system of components now known or hereafter developed.

The joystick-input interface 85 receives an input signal from the joystick 60, and converts this to an input to the computer 81. The camera digitizer 88 and the PTZ control interface 86 are connected to the PTZ Control Multiplexer 87, which is used to pass through the image and control signals from the appropriate camera, out of all the cameras 30,31 connected to it. The camera selection and motion control signals are signals originating in the computer 81, and sent out through the PTZ control interface 86, to the PTZ control Multiplexer 87. The motion control signal is then passed through the PTZ control Multiplexer 87 to the currently selected PTZ camera 30 or 31. The input video signal from the selected PTZ camera 30 or 31 is passed back through the PTZ control Multiplexer 87 at the same time, and is digitized by the Camera Digitizer 88, with that digitized form of the image sent back to the computer 81. In the event that the guard wants to manually use a PTZ camera not currently used by the tracking system, another set of selection and motion control signals originating in the computer 81 will be sent out through the PTZ control interface 86, to the PTZ control Multiplexer 87. This manual motion control signal will then also be passed through the PTZ control Multiplexer 87 to the another manually selected and controlled PTZ camera 30 or 31.

The motion control signal sent out to camera 30 or 31 for automatic tracking of the designated shopper 20 will be determined by the computer 81 from tracking software continuously processing the digitized image from camera digitizer 88.

A description of a particular tracking algorithm of the preferred embodiment of the invention is as follows. The initial view is guaranteed to have the designated shopper 20 to be tracked in it, because the guard 70 selects this individual by clicking on him/her in the image, as shown in FIG. 4. The movement of the shopper 20 is used to segment, this object from the other objects in the image, and a color histogram of the shopper can be formed at that point. This color histogram information, along with last known position, estimated new position based on velocity, height, width and overall size, are used to perform matches to this object in subsequent images. The zoom factor is controlled by zooming in to the point where the shopper's image fills a reasonably large part of the image, but does not exceed it's boundaries. The centroid of the shopper 20 is calculated, and motion control signals sent to the PTZ camera 30 or 31 to ensure that the camera moves to maintain that shopper's centroid near the center of the image. If the shopper 20 temporarily becomes obscured by some other object (e.g. a high display shelf), the software will zoom out slightly and search in the last known vicinity of the shopper until tracking is reestablished.

As the shopper 20 moves throughout the store, it is necessary to "hand-off" the shopper from one camera to another 30 or 31, as required in order to maintain a good view of the shopper. Through the configuration process below, the tracking system. computer 81 has a record of where all the various PTZ cameras 30,31 in the store are located, and of what their total fields of view 100, 101 are. When the shopper 20 reaches the designated boundary for a particular camera 30 or 31, the tracking system automatically moves and focuses the next appropriate camera 30 or 31 to cover that position, which is still known to the system. This camera is then selected for auto-tracking control by the system, and the tracking procedure described above continues in the new field of view 100 or 101. This is depicted in FIG. 5.

The configuration process is necessary in order to determine the total fields of view 100,101 that the various cameras 30,31 in the store system have. This geometry will vary from store to store, and. must be determined automatically, since it will not be reasonable to expect the user to modify the program by entering camera coordinates and field of view angles. In order to accomplish this, a special installation/configuration program will be run when the system is first installed, with all the cameras 30,31 looking for a special flashing marker as a guard slowly traces out a predetermined path throughout the store. This process is shown schematically in FIG. 6. This allows the software to determine relative camera positions with respect to each other, and corresponding boundaries of fields of view 100, 101.

Flow diagrams of a preferred embodiment of this tracking software are included as part of this document in FIG. 7 and FIG. 8. The software may be written in Visual C++™ for a computer 81 running the Windows NT™ operating system. It should be noted that many variations in the algorithm are possible, with accordingly varying levels of system tracking performance.

The tracking system of the present invention is operated in the following manner:

1) the guard 70 selects a PTZ camera 30 or 31 and zooms in on a particular shopper 20, as represented in FIG. 4;
2) the guard moves the mouse 83 until the mouse cursor is superimposed on the shopper's image displayed on the monitor 82, and clicks;
3) the tracking system 80 at that point takes over control of whatever PTZ cameras 30 or 31 are necessary in order to maintain continuous tracking of the subject;
4) if the guard 20 wants to manually control another PTZ camera 30 or 31 that is not in use by the tracking system 80, he/she selects another camera using the program's graphical user interface, and uses the joystick 60 to control that camera.

If the shopper 20 moves out of one camera's field of view 100 to another 101, it will be necessary for the tracking system to perform the hand-off described above; that is, the tracking system will determine which camera 30 or 31 is appropriate for tracking the shopper, and transfer automated tracking control to that camera. This occurs automatically through usage of the configuration information, without requiring the guard's 20 intervention.

Due to the variable geometry of camera placement in stores, an initial configuration/installation procedure is necessary, in order for the system to know which camera 30 or 31 to use to cover a particular area of the store. This is accomplished by an initial configuration procedure depicted in FIG. 6, where a special installation/configuration program is run while the guard 20 walks slowly along a predetermined path with a special flashing marker 160 on a pole, while all the cameras are swept through their total fields of view 100 and 101 recording the position of the marker 160. This allows the tracking system 80 to determine on it's own what the fields of view of the various cameras are, without human intervention. This is an important practical consideration for the users of the tracking system of the present invention.

Accordingly, the automated video person tracking system of this invention provides the user with numerous advantages over the current prior art methods used, while being easy to install and operate. The system automates a task that is ill suited for accomplishment by humans, because of inherent limitations in both dexterity and attention span. The system also provides smoother and more continuous video coverage than a human could in most cases, and frees the user to perform other tasks. Awkward processes, such as the hand-off, or waiting for someone to emerge from behind an obstruction, are accomplished automatically, and the user is able to monitor and control other cameras while the tracking process is taking place.

Although the description above contains many specificities, these should not be construed as limiting the scope of the invention but as merely providing illustrations of some of the presently preferred embodiments of this invention. For example, different algorithms might be used to accomplish the tracking; the environment that the invention is used in might be someplace other than a store; the interfaces mentioned above might be combined into a single unit, etc.

Thus the scope of the invention should be determined by the appended claims and their legal equivalents, rather than by the examples given.

I claim:

1. A system for automated tracking of persons with pan/tilt/zoom cameras, comprising:
   (a) a computer system,
   (b) a pointing device connected to said computer system, providing a means of designating a person to be tracked,
   (c) a means of digitizing an input camera video signal connected to said computer system,
   (d) an interface means allowing a camera motion control signal to be input to said computer system,
   (e) a camera multiplexing means allowing a particular set of camera video and motion control signals to be selected from a multiplicity of said signals and passed through to appropriate input and output connections,
   (f) an interface means allowing a selector signal and camera motion control signals to be output from said computer system to said camera multiplexing means; and
   (g) a software program running on said computer implementing an algorithm providing a means of issuing camera motion control signals to said interface means and multiplexing means in such a manner as to keep the designated person to be tracked centered in the field of view of a pan/tilt/zoom camera.

2. The system of claim 1 wherein said pointing device is a mouse.

3. The system of claim 1 wherein said camera multiplexing means and interface means are combined in a single unit.

4. The system of claim 1 wherein the designation of the person to be tracked is performed automatically by a software program.

5. The system of claim 4 wherein the software program's designation of the person to be tracked is based on an automated face recognition of the person to be tracked.

6. The system of claim 1 wherein said software program determines the necessary information about camera positions and fields of view through an automatic self-configuration procedure.

7. The system of claim 6 wherein said automatic self-configuration procedure is facilitated by the movement through the facility of a special, visibly distinct marker.

8. A method for producing camera motion control signals from a computer system in such a manner as to keep a designated person tracked in the view of a camera as that designated person moves about, comprising:

(a) designating the person to be tracked in an image, (a) segmenting out the designated person being tracked from the rest of the image using motion-based techniques, (b) determining various characteristics of the segmented out region of the image, including color histogram information, and height, width, and overall area in pixels, (c) acquiring another image a short time later from the camera, (d) matching the various characteristics of the designated person with those of all the moving segmented out objects in the new image, in order to find a best match; and (f) computing the appropriate direction to move the camera, in order to keep the best match object approximately centered in the camera view.

9. The method of claim 8 wherein the step of determining said characteristics of the segmented out region of the image includes height, width, and overall area in pixels.

10. The method of claim 8 wherein the step of determining said characteristics of the segmented out region includes the last position of the region in the overall image, and estimating the next likely position of the region based on the last computed velocity.

11. The method of claim 8 further comprising the step of providing a self-configuration procedure whereby the necessary information about camera positions and fields of view is determined.

12. The method of claim 11 wherein said self-configuration procedure further includes the step of the movement through the facility of a special, visibly distinct marker.

13. The method of claim 8 wherein said step of designation of a person to be tracked further includes the step of using face recognition software.

* * * * *